Patented Mar. 13, 1945

2,371,178

UNITED STATES PATENT OFFICE 2,371,178

SULPHANILYL CARBAMIC ACID DERIVATIVES AND THEIR MANUFACTURE

Henry Martin, Rudolf Hirt, and Alfred Staub, Basel, Switzerland, assignors to the firm of J. R. Geigy A. G., Basel, Switzerland No Drawing. Application December 20, 1940, Serial No. 371,056. In Switzerland December 23, 1939

6 Claims. (Cl. 260—397.7)

It has been found that valuable sulphonamide derivatives are obtained, by causing salts of sulphonamides of the benzene series, which contain in the p-position a nitrogen-containing group or a substituent replaceable by such a group, to react with carbonic acid derivatives capable of reaction.

Carbonic acid derivatives of p-aminobenzenesulphonamides, for example p-sulphonamidephenyl-isocyanates and their condensation products with aliphatic, araliphatic, aromatic, hydroaromatic, or heterocyclic compounds with reactive hydrogen have already been described. They differ from the above defined compounds in that the radical of the carbonic acid or of the carbonic acid derivative is bound to the amine group, for example of the p-aminobenzene-sulphonamide, while in the new compounds the radical of the carbonic acid derivative is bound to the sulphonamide group.

As reactive carbonic acid derivatives, which are used in condensation, there are particularly suitable the halides or esters, amides, or anhydrides of the carbonic acid, for example carbonyl chloride, aliphatic, araliphatic and aromatic carbamic acid chlorides, and also aliphatic, araliphatic and aromatic chloro-carbonic acid esters. The claimed condensation products can also be produced by the addition of aliphatic, araliphatic or aromatic isocyanic acid derivatives to salts of sulphonamides.

As the latter components there may be mentioned for example the salts of p-acetylaminobenzene sulphonamide, p-benzylaminobenzene sulphonamide, azobenzene sulphonamide, p-nitrobenzene sulphonamide, and p-chloro- or bromobenzene sulphonamide.

A further modified process for the manufacture of these benzene sulphonamide carbonic acid derivatives, substituted in the p-position by a nitrogen-containing group, consists in causing a benzene sulfonic acid halide having a nitrogen-containing group or a substituent replaceable by such a group in the p-position, to react with a reactive carbamic acid derivative. The claimed new sulphonamide derivatives are remarkably suitable for therapeutical purposes.

The following examples illustrate the present invention. The parts are by weight except where otherwise indicated.

Example 1

135 parts of dry, finely divided sodium p-nitrobenzene-sulphonamide are suspended in 300 parts by volume of nitrobenzene and, while stirring, 25 parts of ethyl-isocyanic acid ester are added thereto. The reaction mixture is kept at 50-60° C. for 15 hours, is then treated with water, is made neutral to phenolphthalein, but alkaline to litmus, with acetic acid, and filtered. The aqueous solution is separated, ethered out and acidified. The precipitated condensation product is washed with water and re-crystallised from alcohol. Melting point 175-176° C.

By reduction with hydrogen and a nickel catalyst N-(p-aminobenzenesulphone)-N'-monoethyl urea is obtained of the following constitution

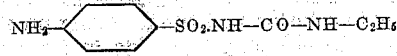

melting point 160° C. In the same manner there can be obtained N-(p-aminobenzene sulphone)-N'-monoethyl urea (melting point 173° C.) or N-(p-aminobenzenesulphone)-monoisoamyl urea (melting point 150-152° C.).

By using benzylisocyanic acid ester instead of ethylisocyanic acid ester the analogous benzylated urea is obtained in exactly the same manner.

Instead of sodium p-nitrobenzene sulphonamide, sodium p-acetylaminobenzene sulphonamide may be used. In this case the corresponding N-(p-acetylaminobenzene-sulphone)-urea is formed. By hydrolysis the acetyl group can be easily removed.

Example 2

Into 44 parts of melted p-nitrobenzenesulphochloride, 15 parts of urea are introduced gradually at 100-120° C. The reaction is completed by heating to 140° C. By re-crystallising the solidified melt from water p-nitrobenzenesulphone-urea is obtained as white crystals which, without being previously melted carbonise at 190° C.

By reduction according to Béchamp with iron the amine is obtained as a product, easily soluble in water and capable of being re-crystallised from alcohol. It sublimates at 320° C. without melting. The hydrochloride is insoluble in alcohol but on the contrary can be recrystallised from water. The base possesses the following constitution

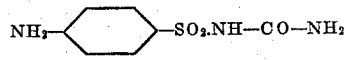

Example 3

22.4 parts of sodium p-nitrobenzene sulphoneamide are suspended in 150 parts by volume of absolute alcohol and 15 parts of chloro-carbonic acid ethyl ester are added thereto. The temperature rises slowly to 40° C. It is heated for 1 hour on the water-bath by reflux, whereby common salt separates as a fine powder. After removing the separated portion the filtrate is evaporated in vacuo, the residue is triturated with bicarbonate solution and filtered by suction. From the filtrate the new nitro body is separated, by acidifying with acetic acid, as a voluminous mass, filtered off and washed with water. It is easily soluble in bicarbonate.

By the action of urethane on p-nitrobenzene sulphonic acid chloride the same product is obtained. By catalytic reduction with Raney nickel p-aminobenzene-sulphonurethane is obtained, melting point 133° C. (decomposition). Instead of chloro-carbonic acid ethyl ester there may be used chloro-carbonic acid methyl-, -n-propyl-, -isopropyl-, -n-butyl-, -isobutylester, but also the chloro-carbonic acid benzyl-, -p-methoxybenzyl-, -3:4-dimethoxybenzyl- or -phenyl ester, the -p-tolyl ester, -m-methoxy- or -ethoxyphenyl ester.

*Example 4*

24.3 parts of potassium p-nitrobenzene sulphonamide are suspended in 75 parts by volume of dry nitrobenzene and treated, while stirring, with 13.5 parts of diethyl-carbamic acid chloride. The mixture is now maintained for 2 hours at 140–150° C., whereby the suspension is converted into an almost homogenous liquid. After cooling, this is stirred into 200 parts by volume of bicarbonate solution and the resulting precipitate of p-nitrobenzene sulphonamide is filtered with suction. The aqueous layer is separated from the nitrobenzene, washed with ether and acidified. The condensation product thus separates as a resin which soon solidifies. By catalytic hydrogenation (with Raney nickel) N-(p-aminobenzene-sulphone)-N'-diethyl urea of melting point of 170° C. (decomposition) is obtained.

Instead of diethylcarbamic acid chloride, dimethyl-, methylphenyl-, or methylbenzyl-carbamic acid chloride can also be used.

*Example 5*

22.4 parts of sodium p-nitrobenzenesulphonamide or equivalent parts of the potassium compound are suspended in 150 parts by volume of dry nitrobenzene and 16.4 parts of p-nitrophenyl-isocyanic acid ester are added thereto. The whole is heated for some hours up to 90–95° C. and then worked up, as described in Example 1.

By catalytic hydrogenation (nickel catalyst) N - (p-aminobenzenesulphone) - N' - (p'-aminophenyl)-urea is obtained, melting point 250° C. (decomposition), of the following constitution

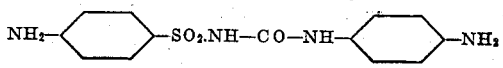

Instead of p-nitrophenyl-isocyanate, m-nitrophenyl-isocyanate may also be used. After the reduction has been completed there is then obtained the N-(p-amino-benzenesulphone)-N'-(m-aminophenyl)-urea, melting point 174° C. (decomposition).

What we claim is:

1. A process for the manufacture of condensation products, comprising reacting a benzenesulphonamide salt of the following general formula

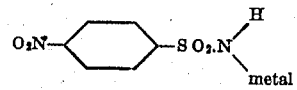

with a member of the group consisting of the alkyl, aralkyl and aryl esters of halogeno-carbonic acid, and reducing the nitro group to the amino group.

2. A process for the manufacture of condensation products, comprising reacting a benzenesulphonamide salt of the following general formula

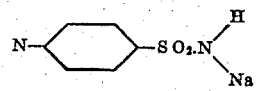

with a member of the group consisting of the alkyl, aralkyl and aryl esters of halogeno-carbonic acid, and reducing the nitro group to the amino group.

3. Condensation products of the sulphonamide class of the following general formula

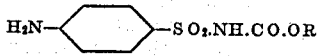

wherein R represents one of the group consisting of H, alkyl, aralkyl and aryl, these sulphonamide derivatives being colorless compounds of therapeutical properties.

4. Condensation products of the sulphonamide class of the following general formula

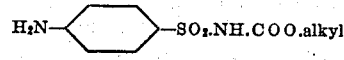

being colorless compound therapeutical properties.

5. Condensation product of the sulphonamide class of the following formula

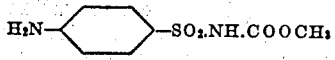

being a colorless compound of therapeutical properties.

6. Condensation product of the sulphonamide class of the following formula

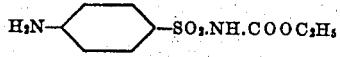

being a colorless compound of therapeutical properties.

HENRY MARTIN.
RUDOLF HIRT.
ALFRED STAUB.

CERTIFICATE OF CORRECTION.

Patent No. 2,371,178. March 13, 1945.

HENRY MARTIN, ET AL.

It is hereby certified that error appears in the printed specification of the above numbered patent requiring correction as follows: Page 2, first column, line 32, for "homogenous" read --homogeneous--; and second column, line 24, claim 2, for that portion of the formula reading " N- " read -- $O_2N$- --; and that the said Letters Patent should be read with this correction therein that the same may conform to the record of the case in the Patent Office.

Signed and sealed this 26th day of June, A. D. 1945.

Leslie Frazer (Seal)                      Acting Commissioner of Patents.